(12) United States Patent
Kakish

(10) Patent No.: US 7,953,910 B2
(45) Date of Patent: May 31, 2011

(54) ALL-IN-ONE PERSONAL COMPUTER WITH EXTERNAL VIDEO INPUT

(75) Inventor: Musa Ibrahim Kakish, Anaheim, CA (US)

(73) Assignee: I/O Interconnect Ltd., Santa Ana, CA (US)

(*) Notice: Subject to any disclaimer, the term of this patent is extended or adjusted under 35 U.S.C. 154(b) by 124 days.

(21) Appl. No.: 12/462,184

(22) Filed: Jul. 30, 2009

(65) Prior Publication Data

US 2010/0205336 A1 Aug. 12, 2010

Related U.S. Application Data

(60) Provisional application No. 61/207,269, filed on Feb. 10, 2009.

(51) Int. Cl.
*G06F 3/038* (2006.01)
*G06F 13/12* (2006.01)
*H04N 5/445* (2006.01)
*H05K 5/00* (2006.01)

(52) U.S. Cl. ..... 710/65; 345/204; 348/563; 361/679.01; 361/679.02; 710/62

(58) Field of Classification Search .................. 345/204, 345/205, 208; 348/552, 553, 563, 571, 575; 361/600, 679.01, 679.02; 710/1, 62, 65, 72, 100, 300
See application file for complete search history.

(56) References Cited

U.S. PATENT DOCUMENTS

| | | | |
|---|---|---|---|
| 6,980,225 B2* | 12/2005 | Funamoto et al. | 345/691 |
| 2008/0018789 A1* | 1/2008 | Lin | 348/552 |
| 2008/0303946 A1* | 12/2008 | Cox et al. | 348/552 |
| 2009/0051765 A1* | 2/2009 | Moberly | 348/77 |
| 2010/0106884 A1* | 4/2010 | Abraham et al. | 710/316 |

OTHER PUBLICATIONS

Genesis; gm5766 Dual Input LCD Controller for UXGA Applications; Aug. 2005; Preliminary Product Brief; pp. 1-2.*

* cited by examiner

*Primary Examiner* — Alford W Kindred
*Assistant Examiner* — Richard B Franklin

(57) ABSTRACT

An AIO PC has its LVDS link or interface, between the mother board and the LCD, modified by the insertion of an LVDS Switch which can connect to a second LVDS source such as LCD controller which takes its input from a socket mounted on the housing of the AIO PC. The LVDS switch and LCD controller are located within the enclosure or housing of the AIO PC. The LVDS switch is controlled by a physical electromechanical switch.

11 Claims, 3 Drawing Sheets

ALL-IN-ONE PERSONAL COMPUTER WITH EXTERNAL VIDEO INPUT

CROSS REFERENCE TO RELATED APPLICATION

This application takes priority from and claims the benefit of Provisional Application Ser. No. 61/207,269 filed on Feb. 10, 2009 the contents of which are hereby incorporated by reference.

BACKGROUND OF THE INVENTION

1. Field of the Invention
The present invention relates to an all-in-one computer.
2. Description of the Related Art
An all-in-one computer (AIO) is a personal computer (PC) comprising:
a housing;
a mother board accommodated in the housing;
a visual display unit (VDU) mounted on the housing.
Typically the VDU is an liquid crystal display (LCD).

Integrating the display into the housing of a computer provides a convenient and simple computer package that some consumers prefer, especially when it is to be located in a living room environment. Designers take advantage of the fact that no long video cables are required and make cost savings by using an LCD panel video interface on the mother board that can directly drive the short link cable to the built-in display screen.

The signal connections provided on most LCD panels are LVDS (Low Voltage Differential Signal) connections, whose interface can typically be 6 or 8 bits wide.

Normally in a personal computer, a video standard such as VGA (Video Graphics Array), DVI (Digital Visual Interface) or HDMI (High Definition Multimedia Interface) conversion would be required on the mother board, or on a plug-in graphics card, and made available on socket(s) on a rear panel of the computer housing for the user to attach a cable to their chosen display. The conversion to these video standards by an LCD controller in addition needs to include a scaler, to meet a range of screen resolutions that to the user may require. An AIO PC however has no scaler since the resolution of the built in screen is known and fixed.

Another function normally provided by the LCD controller is On-Screen-Display (OSD) graphical menu and adjustment—whereby the user can alter such display parameters as brightness, contrast, color. The AIO PC however controls these parameters, and generates the user graphical interface in software on the mother board.

SUMMARY OF THE INVENTION

The object of the present invention is to allow an external device to feed a video signal to the AIO PC built-in display.

According to the invention there is provided an all-in-one personal computer (AOI PC) comprising:
a housing;
a mother board accommodated in the housing;
a visual display unit (VDU) mounted on the housing;
an external video signal input connection on the housing;
means for converting an external video signal to Low Voltage Differential Signal (LVDS) format;
a LVDS interface between the mother board and the VDU; and
an LVDS switch in the LVDS interface and connected to the said conversion means,
the arrangement being such that in one state of the LVDS switch, the VDU is connected to display data from the mother board and in another state of the LVDS switch the VDU is connected to display an external video signal.

Normally the visual display will be an LCD.

The switching state could be controlled by a physical switch, possibly ganged to a KVM switch mounted on the computer, or preferably under control of a USB controller which receives a USB command from a software program running on the AIO PC. The software program may take its instruction from the user via a menu user interface, or be linked to a KVM type function where keyboard, pointer (mouse), and audio signals are also switching.

Please note that our co-pending patent application claiming priority from our provisional application No. 61/203,272, filed on 22 Dec. 2009, describes an AIO PC having:
keyboard, mouse and video (KVM) switch means mounted on the housing and adapted:
to receive keyboard and mouse data from single respective input devices and switch them to the central processor unit in one state of the switch or at least one other output therefor in a respective other state and
to receive VDU data from the central processor unit and at least one other input thereof and switch them from the central processor unit to the VDU in the one state and from the respective other input to the VDU in the respective other state and
means for changing the state of the KVM switch means.

Preferably the AIO PC includes an LCD controller having a scaler for scaling the video signal from the external device.

In one variant, the AIO PC has two independent On-Screen Display (OSD) graphical menus and sets of parameters. This arrangement may be beneficial since the MO video may require different parameter settings to that required for optimum viewing of an external video signal which may have different resolution, contrast, brightness or other attributes.

An illusion of a single OSD can be provided if the LCD controller stores the OSD parameters, for example, in non-volatile RAM which can be read from/written to by the AIO PC so that they can be replicated between both switch states. The OSD user-push-buttons to select menu and adjustments can be switched, (concurrently with the LVDS switch) between the LCD controller and a USB Human Interface Device (HID) device, so that the same push buttons are used to interface with both OSD. Furthermore, the OSD graphics can be made identical so the user does not perceive any difference between the two OSD menus.

Consistency for display Brightness and Audio Volume can be maintained by coordinating settings between the two switch states. Brightness is effected by a PWM (Pulse Width Modulated) signal fed to a backlight inverter driving the display's Cold Cathode Fluorescent (CCFL) tubes, or alternatively an LED driver circuit in the case of an LED backlit display or Organic Light Emitting Diodedisplay (OLED). Similarly audio volume is generally controlled by a PWM signal fed to the amplifier driving the PC Speakers.

The brightness and audio volume PWM signals in one arrangement can be generated by circuits on the mother board, their setting values being read from dual port non-volatile RAM used to store the LCD controller parameters. Any changes the user makes while the switch is in the mother board state, would be written to the non-volatile RAM. In another embodiment the LCD controller PWM signals can be maintained, even when the display video source is switched over to the mother board. Any user adjustments to the parameters would be written to the LCD controllers non-volatile RAM.

BRIEF DESCRIPTION OF THE DRAWINGS

To help understanding of the invention, various specific embodiments thereof will now be described by way of example and with reference to the accompanying drawings, in which.

DETAILED DESCRIPTION OF THE PREFERRED EMBODIMENT

Figure 1:
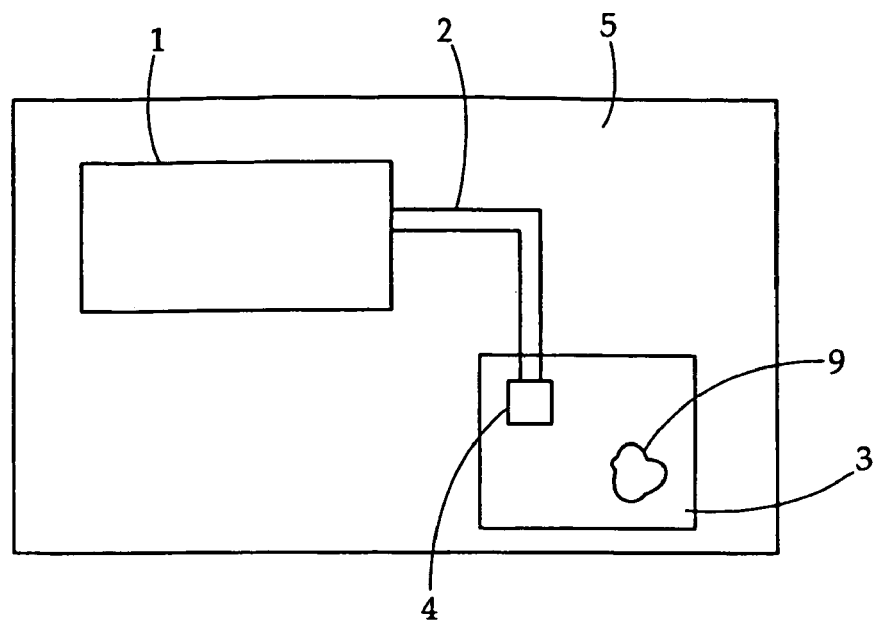
FIG. 1 is a pictorial diagram of the video connection within a prior art All-In-One PC.

Referring first to FIG. 1, a known All-In-One PC (AIO PC) comprises a housing 5, in which is mounted a mother board 3 having with video graphic circuit 4 and loaded with specific graphic software 9. A Low Voltage Differential Signal (LVDS) interface 2 connects the mother board graphic circuit to an LCD (Liquid Crystal Display) 1 mounted on the housing. The LVDS interface drives the LCD display directly. On-Screen Display (OSD) graphics and parameter adjustment is provided for by the software 9.

There is no possibility to connect an external video input to the AIO PC of FIG. 1.

Figure 2:
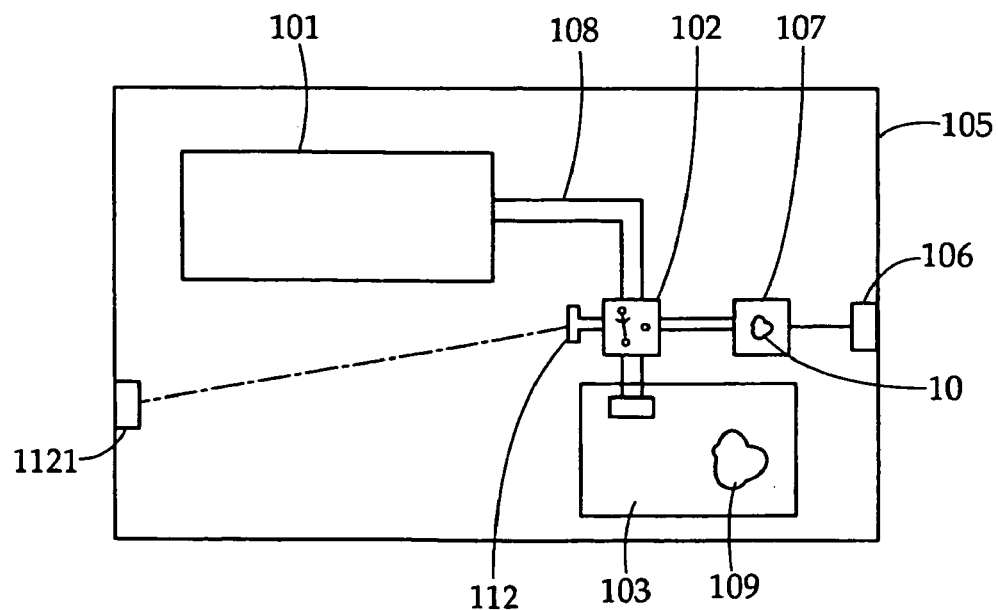
FIG. 2 is a similar pictorial diagram of an AIO PC in accordance with the invention.

Referring now to FIG. 2, the AIO PC shown there is in accordance with the invention and has its LVDS link or interface 102, between the mother board 103 and the LCD 101, modified by the insertion of an LVDS Switch 108 which can connect to a second LVDS source such as LCD controller 107 which takes its input from a socket 106 mounted on the housing 105 of the AIO PC. The LCD controller, such as Genesis Microchip Inc., part GM5766 for example, has VGA, DVI and HDMI inputs, an OSD and Scaler, and an output with LVDS signals. The LVDS switch 108 and LCD controller 107 are preferably located within the enclosure or housing 105 of the AIO PC. The socket 106 will normally be of VGA, DVI or HDMI type for easy compatibility and long connection by cable to external video sources. The LVDS switch 108 is controlled by a physical electromechanical switch 112. Optionally the switch 112 is ganged to and controlled by a keyboard, video and mouse switch 1121, mounted on the housing 105. The video switching function of switch 1121 is performed by the switch 112.

The LCD controller 107 has software to perform the OSD function for the LCD controller as well as a scaler. In this arrangement there are two OSD menus and two sets of parameters, one for each video source.

Figure 3:
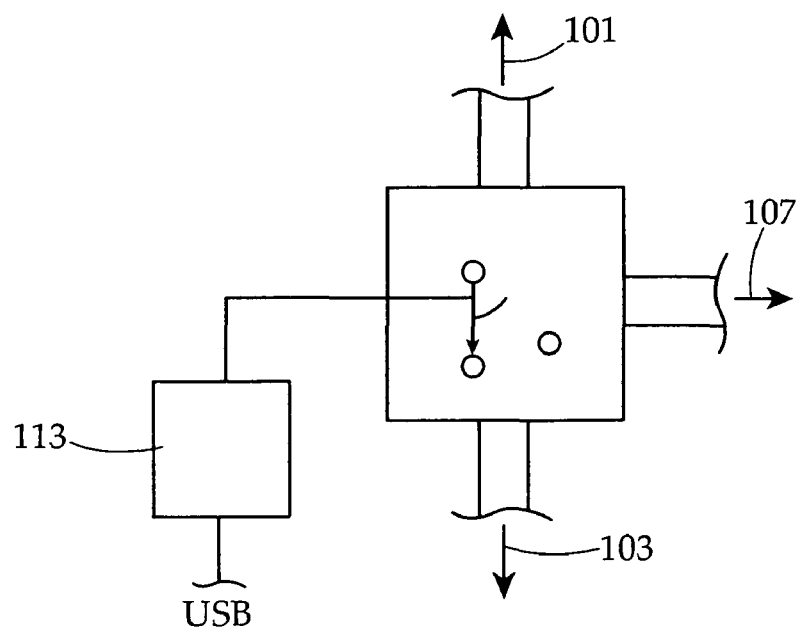
FIG. 3 is a scrap pictorial diagram of an LVDS switch in the AIO PC of FIG. 2 providing with unified OSD parameters.

Alternatively, as shown in FIG. 3, the switching can be under AIO PC software control. The AIO PC is programmed with software enabling user control, via a menu user interface, of the LVDS switch. The software generates a signal to a USB controller 113 arranged upstream of the LVDS Switch 108 for its control, as shown in FIG. 3.

Figure 4:
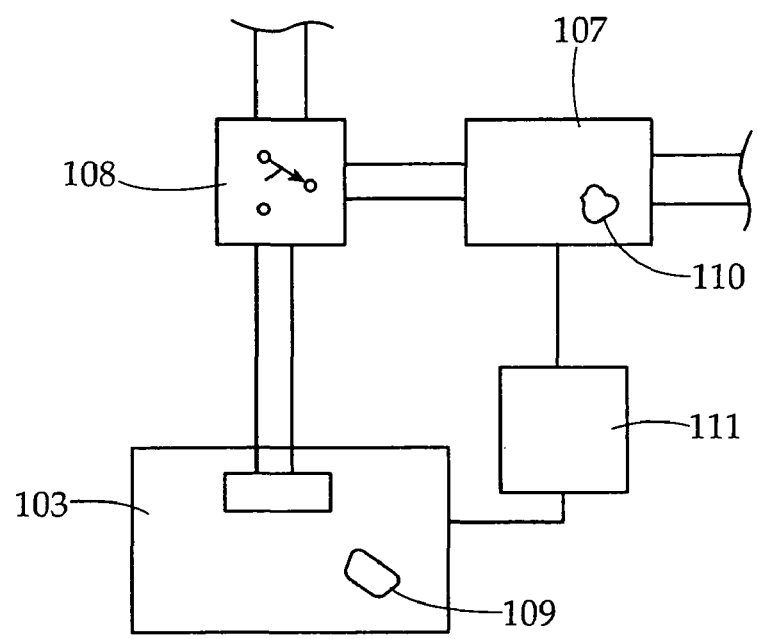
FIG. 4 is a similar pictorial diagram of a variant in which LVDS switching is under software control.

FIG. 4 shows a variant where common OSD parameters are shared by the LCD controller 107 and the mother board 103, the OSD parameters being stored in a dual port non-volatile RAM 111 to which both the LCD controller and the mother board are connected.

Figure 5:
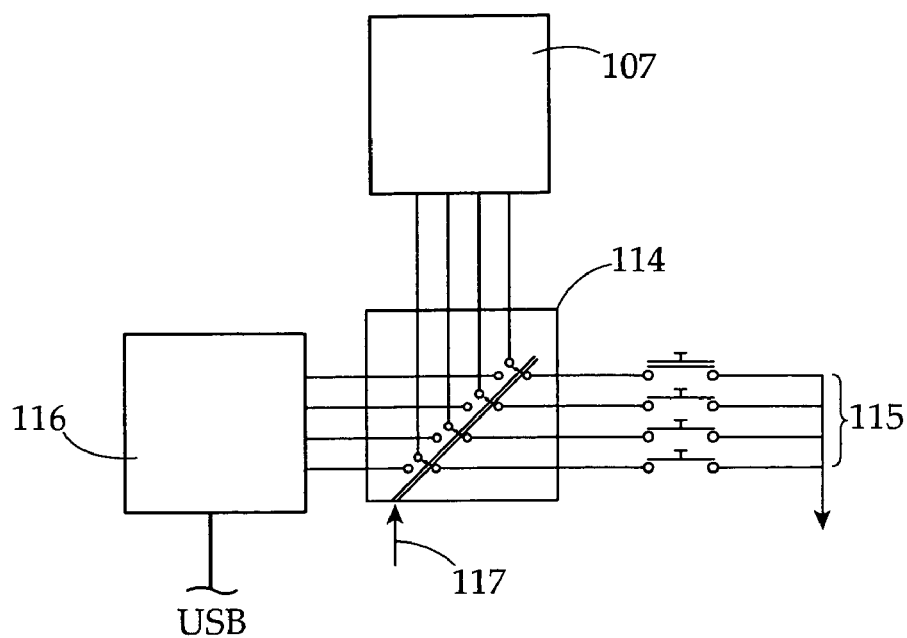
FIG. 5 is a similar pictorial diagram of a further variant in which OSD push buttons provide switching between LCD controller and mother board.

FIG. 5 shows a further variant that provides the illusion of one OSD. User actuated, OSD push-buttons 115 can be switched by a multiplexer 114 between the LCD controller 107 and the mother board via a USB HID device 116 concurrently with the video switching. The multiplexer switch input 117 can be driven from the HID device 116 under instruction from software in the AIO PC.

Figure 6:
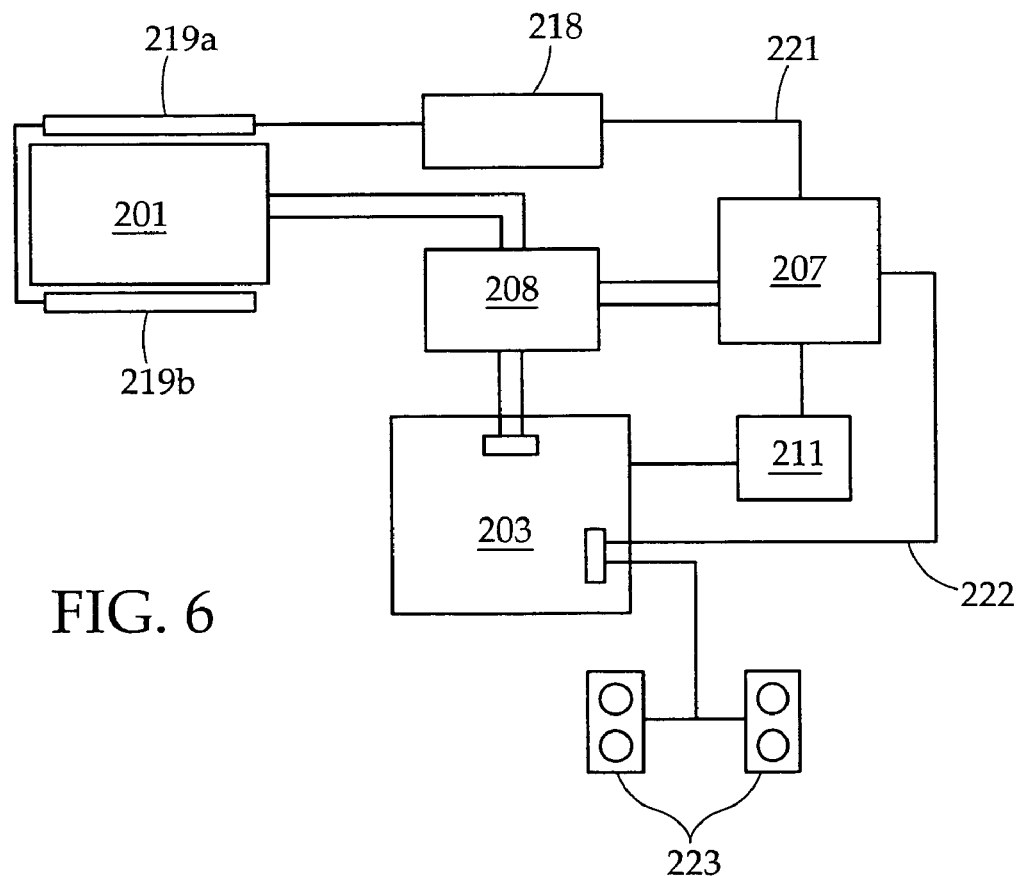
FIG. 6 is a pictorial diagram of a second embodiment having PWM control of Brightness and Audio volume.

FIG. 6 shows another embodiment with an arrangement for consistent control of the display Brightness and Audio Volume settings between the two switch states. The LCD controller 207 provides a PWM signal 221 to the display backlight inverter 218 which drives the CCFL tubes 219a and 219b for lighting the LCD 201. The LCD controller 207 also provides a PWM signal 222 to an audio amplifier 220 which drives the AIO PC's speakers 223. The Brightness and Volume parameter settings are stored in the LCD controller's dual-port non-volatile RAM 211, and updated either by the LCD controller or the mother board 203 depending on which OSD is in use when adjustments are made. The LCD controller is consistent in providing the PWM signals, based on the stored RAM settings, even when the LVDS switch 208 is set to source video from the mother board 203.

I claim:

1. An all-in-one personal computer (AIO PC) comprising:
   a housing;
   a mother board accommodated in the housing;
   a visual display unit (VDU) mounted on the housing;
   an external video signal input connection on the housing;
   means for converting an external video signal to Low Voltage Differential Signal (LVDS) format;
   an LVDS interface between the mother board and the VDU; and
   an LVDS switch in the LVDS interface and connected to the said conversion means,
   the arrangement being such that in one state of the LVDS switch, the VDU is connected to display data from the mother board and in another state of the LVDS switch the VDU is connected to display an external video signal;
   wherein the conversion means is an LCD controller having a scaler for scaling the video signal from the external device, and the controller is arranged between the LVDS switch and the external video signal input connection;
   wherein the mother board is programmed to present On-Screen Display (OSD) graphical menus and sets of parameters when the LVDS switch is set to present video data from the mother board and the LCD controller is programmed to present On-Screen Display (OSD) graphical menus and sets of parameters when the LVDS switch is set to external video data, the two sets of menus and parameters being independent of each other.

2. The AIO PC according to claim 1, wherein the VDU is an LCD.

3. The AIO PC according to claim 1, wherein the LVDS switch is an electromechanical switch.

4. The AIO PC according to claim 1, wherein the LVDS switch is an electronic device.

5. The AIO PC according to claim 4, including a USB controller for the LVDS switch and wherein the AIO PC is programmed with software enabling user control, via a user-interface menu, of the LVDS switch via a USB command to the USB controller.

6. The AIO PC according to claim 5, wherein the software and the user-interface menu includes a KVM switch function.

7. The AIO PC according to claim 4, including key board, video & mouse (KVM) switch means mounted in the housing for controlling the LVDS switch.

8. An all-in-one personal computer (AIO PC) comprising:
   a housing;
   a mother board accommodated in the housing;
   a visual display unit (VDU) mounted on the housing;
   an external video signal input connection on the housing;
   means for converting an external video signal to Low Voltage Differential Signal (LVDS) format;
   an LVDS interface between the mother board and the VDU;
   an LVDS switch in the LVDS interface and connected to the said conversion means,
   the arrangement being such that in one state of the LVDS switch, the VDU is connected to display data from the mother board and in another state of the LVDS switch the VDU is connected to display an external video signal; and
   a dual port non-volatile RAM;
   wherein the conversion means is an LCD controller having a scaler for scaling the video signal from the external device, and the controller is arranged between the LVDS switch and the external video signal input connection;
   wherein OSD parameters are stored in the dual port non-volatile RAM, and both the LCD controller and the mother board are connected to the dual port non-volatile RAM.

9. An all-in-one personal computer (AIO PC) comprising:
   a housing;
   a mother board accommodated in the housing;
   a visual display unit (VDU) mounted on the housing;
   an external video signal input connection on the housing;
   means for converting an external video signal to Low Voltage Differential Signal (LVDS) format;
   an LVDS interface between the mother board and the VDU;
   an LVDS switch in the LVDS interface and connected to the said conversion means,
   the arrangement being such that in one state of the LVDS switch, the VDU is connected to display data from the mother board and in another state of the LVDS switch the VDU is connected to display an external video signal;
   user actuatable OSD push-buttons; and
   a multiplexer connected to the push-buttons;
   wherein the conversion means is an LCD controller having a scaler for scaling the video signal from the external device, and the controller is arranged between the LVDS switch and the external video signal input connection;
   wherein the multiplexer selectively connects the buttons to the LCD controller or to the mother board for OSD adjustment.

10. The AIO PC according to claim 9, including:
    a USB controller for the LVDS switch, the AIO PC being programmed with software enabling user control, via a user-interface menu, of the LVDS switch via a USB command to the USB controller;
    wherein the USB controller is connected to the multiplexer for concurrent control of the LVDS switch and the multiplexer.

11. An all-in-one personal computer (AOI PCAIO PC) comprising:
    a housing;
    a mother board accommodated in the housing;
    a visual display unit (VDU) mounted on the housing;
    an external video signal input connection on the housing;
    means for converting an external video signal to Low Voltage Differential Signal (LVDS) format;
    an LVDS interface between the mother board and the VDU;
    an LVDS switch in the LVDS interface and connected to the said conversion means,
    the arrangement being such that in one state of the LVDS switch, the VDU is connected to display data from the mother board and in another state of the LVDS switch the VDU is connected to display an external video signal;
    means in the LCD controller for producing a pulse width modulated signal modulated in accordance with the desired brightness of the VDU;
    a VDU backlight inverter for driving a backlight in accordance with the desired brightness; and
    a dual port non-volatile RAM;
    wherein the conversion means is an LCD controller having a scaler for scaling the video signal from the external device, and the controller is arranged between the LVDS switch and the external video signal input connection;
    wherein the backlight is a cold cathode fluorescent light or a light emitting diode light or an organic light emitting diode light;
    wherein OSD parameters are stored in the dual port non-volatile RAM, and both the LCD controller and the mother board are connected to the dual port non-volatile RAM.

* * * * *